(12) United States Patent
Reep et al.

(10) Patent No.: US 10,591,048 B2
(45) Date of Patent: Mar. 17, 2020

(54) CONTINUOUSLY VARIABLE TRANSMISSION PEDAL CONTROL SYSTEM

(71) Applicant: Deere & Company, Moline, IL (US)

(72) Inventors: Kenneth M. Reep, Lincolnton, NC (US); David W. Geiger, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 1082 days.

(21) Appl. No.: 14/326,975

(22) Filed: Jul. 9, 2014

(65) Prior Publication Data

US 2016/0010745 A1 Jan. 14, 2016

(51) Int. Cl.
| G05G 5/05 | (2006.01) |
| F16H 59/06 | (2006.01) |
| F16H 59/10 | (2006.01) |
| F16H 59/02 | (2006.01) |

(52) U.S. Cl.
CPC ............. *F16H 59/06* (2013.01); *F16H 59/10* (2013.01); *G05G 5/05* (2013.01); *F16H 2059/0234* (2013.01)

(58) Field of Classification Search
CPC .. G05G 1/01; G05G 1/34; G05G 1/36; G05G 1/44; G05G 1/46
See application file for complete search history.

(56) References Cited

U.S. PATENT DOCUMENTS

| 3,470,757 A | 10/1969 | Miley |
| 3,583,535 A | 6/1971 | Plamper |
| 3,691,863 A | 9/1972 | Shaffer |
| 3,759,342 A | 9/1973 | Plamper |
| 3,777,585 A | 12/1973 | Plamper |
| 4,014,218 A | 3/1977 | Brandt |
| 4,176,560 A | 12/1979 | Clarke |
| 4,250,768 A * | 2/1981 | Hildebrecht .......... B60W 10/06 74/473.16 |
| 5,022,477 A | 6/1991 | Wanie |
| 5,048,638 A | 9/1991 | Duncan et al. |
| 5,231,891 A | 8/1993 | Morita et al. |

(Continued)

FOREIGN PATENT DOCUMENTS

| JP | H0274418 A | 3/1990 |
| JP | 2014008836 A | 1/2014 |

OTHER PUBLICATIONS

Machine Translation of JP H0274418, obtained Apr. 19, 2018.*

(Continued)

*Primary Examiner* — Richard W Ridley
*Assistant Examiner* — Brian J McGovern

(57) ABSTRACT

A continuously variable transmission pedal control system includes a forward pedal connected to a forward pivoting bracket, a reverse pedal connected to a reverse pivoting bracket, a first spring connecting the forward pivoting bracket to a linkage such as a bell crank at a first attachment point, and a second spring connecting the reverse pivoting bracket to the linkage at a second attachment point. The linkage may be connected by a motion control rod to a continuously variable transmission that provides a variable forward traction drive speed based on a position of the forward pedal and a variable reverse traction drive speed based on a position of the reverse pedal.

6 Claims, 2 Drawing Sheets

(56) References Cited

U.S. PATENT DOCUMENTS

| | | | |
|---|---|---|---|
| 5,410,923 A | 5/1995 | Yamashita et al. | |
| 5,509,496 A | 4/1996 | Erickson et al. | |
| 5,842,378 A | 12/1998 | Zellmer | |
| 6,357,232 B1 | 3/2002 | Strashny | |
| 8,308,613 B1* | 11/2012 | Nawrocki | F02D 11/02 |
| | | | 477/186 |
| 2003/0136593 A1* | 7/2003 | Vuksa | B60T 1/062 |
| | | | 180/53.6 |
| 2004/0040400 A1* | 3/2004 | Pilz | B60T 7/06 |
| | | | 74/480 R |
| 2008/0028882 A1* | 2/2008 | Sakamoto | F16H 59/06 |
| | | | 74/473.17 |
| 2008/0229870 A1* | 9/2008 | Gray | G05G 1/30 |
| | | | 74/513 |
| 2011/0056327 A1* | 3/2011 | Mazzucchi | B60T 7/042 |
| | | | 74/512 |
| 2011/0066328 A1* | 3/2011 | Vescovini | B60T 7/042 |
| | | | 701/41 |

OTHER PUBLICATIONS

Search Report in counterpart application No. GB1511451.5 dated Dec. 18, 2015 (6 pages).
German Search Report issued in counterpart application No. 102015212210.7 dated Apr. 16, 2019. (10 pages).

* cited by examiner

CONTINUOUSLY VARIABLE TRANSMISSION PEDAL CONTROL SYSTEM

FIELD OF THE INVENTION

This invention relates to grass mowing machines, and more specifically to a continuously variable transmission pedal control system for traction drive of a lawn and garden tractor.

BACKGROUND OF THE INVENTION

Some lawn and garden tractors have traction drive systems using a continuously variable transmission (CVT) with a rubber V-belt. The rubber V-belt runs between two V-belt pulleys that are split perpendicular to their axes of rotation. The gear ratio may be changed by moving the two sheaves of one pulley closer together and the two sheaves of the other pulley farther apart. This changes the effective diameter of the pulleys, which in turn changes the gear ratio.

Lawn and garden tractor with CVTs for traction drive typically have two input controls, one for directional control and the other for speed variation. For example, a lawn and garden tractor with a CVT for traction drive may have a transmission shift lever with forward, neutral and reverse positions, and a travel pedal for speed variation. A CVT pedal control system is needed that does not also require a transmission shift lever.

Direction and speed control input forces for lawn and garden tractor CVTs may be significantly higher than those control input forces are on comparable hydrostatic and mechanical transmissions. For example, higher input forces are needed to compress the sheaves to increase speed. It may be difficult to get input forces high enough to shift a CVT through the full range of speed variation when the lawn and garden tractor is in a static state and the sheaves are not turning. A CVT pedal control system is needed that provides higher input forces than conventional pedal controls. Additionally, transmission linkages between the input controls and CVT may be subject to high input forces, and there is a need for a CVT pedal control system that can limit the forces that could damage transmission linkages and components, and that also can be used with hydrostatic and mechanical transmissions on lawn and garden tractors.

SUMMARY OF THE INVENTION

A continuously variable transmission pedal control system includes a forward traction drive pedal and a reverse traction drive pedal mounted side by side in a lawn and garden tractor operator station. A coil spring connects each traction drive pedal to a linkage such as a bell crank to a motion control rod. The motion control rod connects to a control input of a continuously variable transmission that operates in a forward traction drive mode if the forward drive pedal is actuated and in a reverse traction drive mode if the reverse pedal is actuated.

DESCRIPTION OF THE PREFERRED EMBODIMENT

Figure 1:
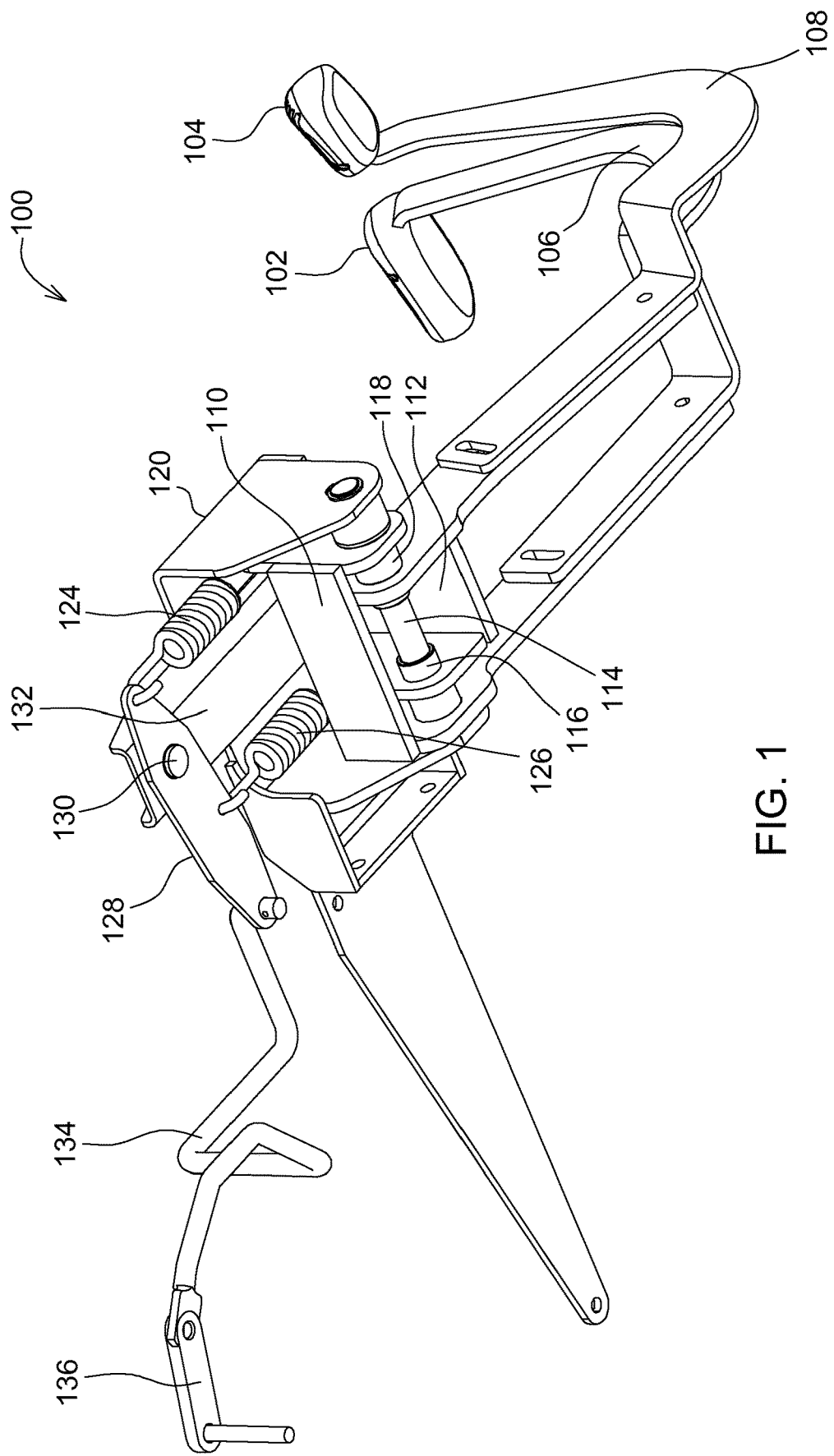
FIG. 1 is a perspective view of a continuously variable transmission pedal control system according to a first embodiment of the invention.
Figure 2:
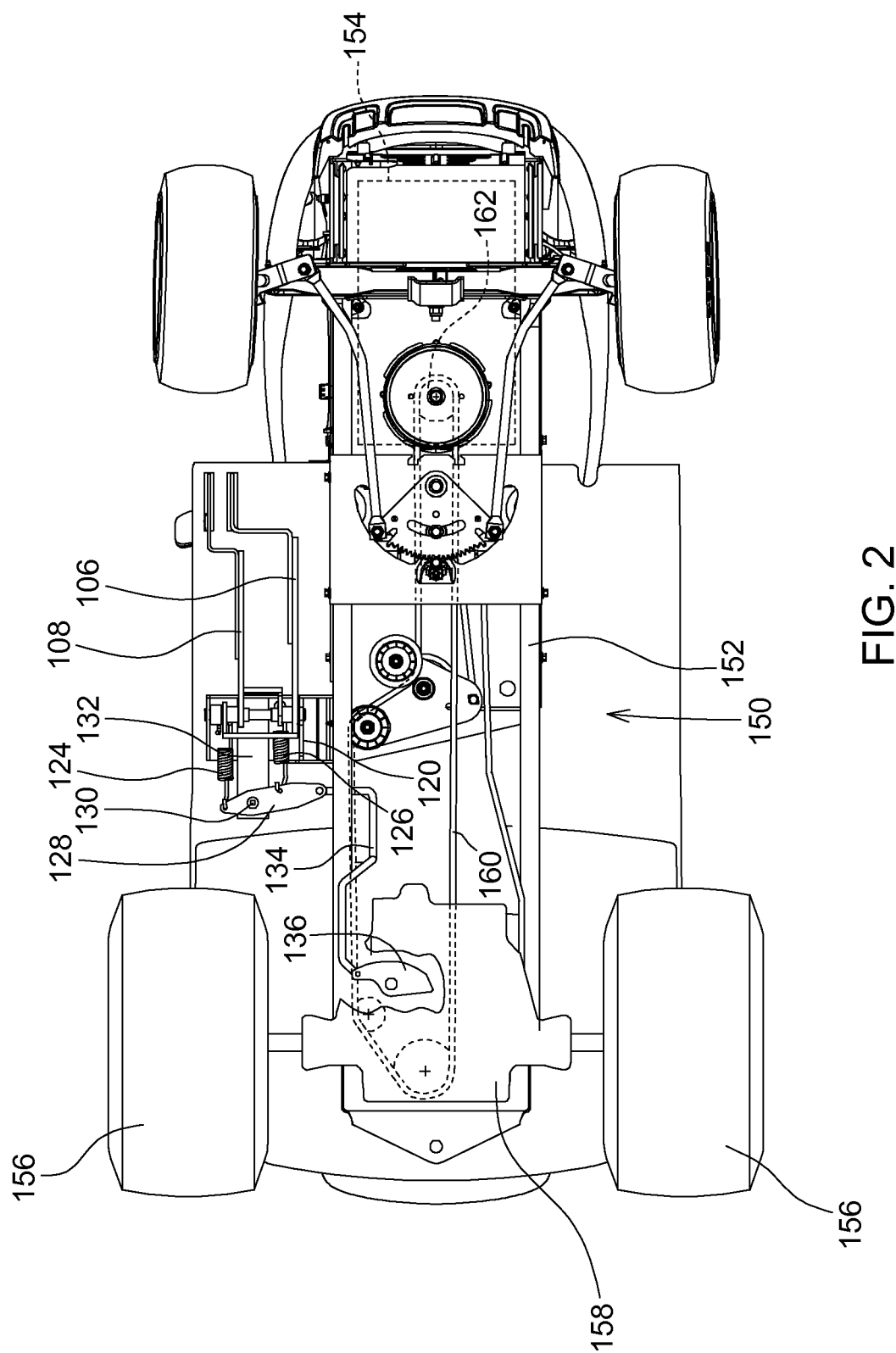
FIG. 2 is a bottom view of a lawn and garden tractor with a continuously variable transmission pedal control system according to a first embodiment of the invention.

FIGS. 1-2 show one embodiment of continuously variable transmission (CVT) pedal control system 100 for traction drive of a lawn and garden tractor. The CVT pedal control system includes forward traction drive pedal 102 and reverse traction drive pedal 104 mounted side by side on the right side of an operator station of lawn and garden tractor 150. The forward pedal may be on a first end of forward pedal arm 106, and forward pivoting bracket 110 may be on a second end of forward pedal arm 106. The reverse pedal may be on a first end of reverse pedal arm 108, and reverse pivoting bracket 112 may be on second end of reverse pedal arm 108. Pivoting brackets 110 and 112 each may be arranged next to each other so each can pivot independently on shaft 114 which may be aligned transversely to the lawn and garden tractor's main axis, although the shaft need not be perpendicular to the axis. Sleeves 116, 118 or plastic bushings may be provided between the shaft and pivoting brackets.

In one embodiment, bracket 120 may be bolted or otherwise secured to the frame of the lawn and garden tractor, or may be integral with the frame. The bracket may support the opposing ends of shaft 114. Coil spring 124 may connect between forward pivoting bracket 110 and an attachment point near the first end of bell crank 128, and coil spring 126 may connect between reverse pivoting bracket 112 and an attachment point at an intermediate area near the center of bell crank 128. The pair of springs may limit the forces that each of the pedals can deliver to bell crank 128 and CVT 158.

In one embodiment, the CVT pedal control system may include a linkage such as bell crank 128 mounted to support bracket 132 at pivot axis 130. The bell crank's pivot axis 130, which may be generally vertically aligned and secured to support bracket 132, is located between the attachment points of the pair of coil springs. A first or forward end of motion control rod 134 may be connected to the second or opposite end of bell crank 128, and a second or rearward end of motion control rod 134 may be connected to CVT 158. Thus, the bell crank connected to the motion control rod may provide a signal to the transmission that is inverted, as the bell crank pivots to move motion control rod 134 in a first direction in response to the forward pedal and coil spring 124, or in a second or opposite direction in response to the reverse pedal and coil spring 126. Additionally, the signal to the transmission may be scaled, as the signal to the transmission may be different for the pedal travel of the forward and reverse pedals.

In alternative embodiments, the CVT pedal control system may include other linkages instead of bell crank 128. The pair of coil springs 124, 126 may be connected to other linkages to the motion control rod and transmission that may be inverted and scaled. For example, one of the pair of coil springs may be connected to a pulley and the other may be connected to a slider to which the pulley is mounted. The slider may move the motion control rod in a first direction in response to spring 124, and in a second direction in response to spring 126, providing an output signal to the transmission that is inverted and scaled. Another example is a pinion and rack, which may move the motion control rod in opposite directions depending on which spring is actuated by the pedals. Additionally, the embodiment is shown with a rubber belt-driven CVT, but the system also may be used on lawn and garden tractors with hydrostatic or mechanical transmissions.

As shown in FIG. 2, in one embodiment, CVT pedal control system 100 may be installed on lawn and garden tractor 150 having engine 154 supported on a forward end of frame 152 and CVT 158 supported on a rearward end of the frame between rear wheels 156. Drive belt 160 may connect engine output pulley 162 to CVT 158. CVT 158 also may include a rubber V-belt and variable diameter V-belt pulleys (not shown) that may be shifted between forward traction drive and reverse traction drive of rear wheels 156. CVT 158 also may include CVT input control arm 136 pivotably connected to motion control rod 134, and the CVT input control arm may pivot in a first direction to operate the CVT in forward drive or in a second direction to operate the CVT in reverse.

In one embodiment, if the operator depresses forward pedal 102, spring 124 may exert a force urging linkage 128 to move or pivot in a first direction, moving motion control rod 134. For example, spring 124 may pull one end of the bell crank forward and the motion control rod pushes backward. As a result, motion control rod 134 pivots CVT input control arm 136 in a first direction to rotate rear wheels 156 at a forward speed based on the forward pedal position. If the operator depresses reverse pedal 104, spring 126 exerts a force urging linkage 128 to move or pivot in a second or opposite direction, moving motion control rod 134 in a second or reverse direction. As a result, motion control rod 134 pivots CVT input control arm 136 in a second direction to rotate rear wheels 156 at a reverse speed based on the reverse pedal position. Coil springs 124, 126 may limit maximum forces that may be applied by the CVT pedal control system to the CVT and traction drive linkages. Additionally, the system may be self adjusting because the pair of springs bias each of the pedals to the neutral position, and also prevent the linkage such as bell crank 128 from reaching a slack state.

Having described the preferred embodiment, it will become apparent that various modifications can be made without departing from the scope of the invention as defined in the accompanying claims.

The invention claimed is:

1. A continuously variable transmission pedal control system, comprising:
    a forward pedal connected to a forward pivoting bracket;
    a reverse pedal connected to a reverse pivoting bracket;
    a first spring connecting the forward pivoting bracket to a first attachment point at a first end of a bell crank connected to a continuously variable transmission and exerting a first spring pulling force urging the bell crank to pivot in a first direction when depressing the forward pedal;
    a motion control rod attached to the bell crank at a motion control rod attachment point of the bell crank and connecting the bell crank to the continuously variable transmission;
    a second spring connecting the reverse pivoting bracket to a second attachment point between the motion control rod attachment point and a pivot axis of the bell crank and exerting a second spring pulling force urging the bell crank to pivot in a second direction when depressing the reverse pedal;
    the pivot axis of the bell crank is perpendicular to a pivot axis of the forward pivoting bracket;
    the continuously variable transmission providing a variable forward traction drive speed if the motion control rod moves in a first direction and a variable reverse traction drive speed if the motion control rod moves in a second direction.

2. The continuously variable transmission pedal control system of claim 1 wherein a pivot axis of the reverse pivoting bracket is coaxial with the pivot axis of the forward pivoting bracket.

3. The continuously variable transmission pedal control system of claim 1 wherein the forward pedal and the reverse pedal are mounted side by side.

4. A continuously variable transmission pedal control system, comprising:
    a forward traction drive pedal and a reverse traction drive pedal mounted side by side in a lawn and garden tractor operator station;
    a first coil spring and a second coil spring, the first coil spring connecting the forward traction drive pedal to a first attachment point at a first end of a bell crank that pivots in a first direction in response to a pulling force of the first coil spring, and the second coil spring connecting the reverse traction drive pedal to a second attachment point of the bell crank that pivots in a second direction in response to a pulling force of the second coil spring; and
    a motion control rod attached to the bell crank at a motion control rod attachment point at a second end of the bell crank and connecting the bell crank to a control input of a continuously variable transmission that operates in a forward traction drive mode if the bell crank pivots in the first direction and in a reverse traction drive mode if the bell crank pivots in the second direction;
    the second attachment point is between the motion control rod attachment point and a pivot axis of the bell crank;
    the pivot axis of the bell crank is perpendicular to a pivot axis of the forward traction drive pedal.

5. The continuously variable transmission pedal control system of claim 4 further comprising a forward pedal arm attached to the forward traction drive pedal and a reverse pedal arm attached to the reverse traction drive pedal, both the forward pedal arm and the reverse pedal arm are mounted on a single shaft.

6. A continuously variable transmission pedal control system, comprising:
    a bell crank connected by a first spring to a forward pedal and a second spring to a reverse pedal; the first spring and the second spring exerting tensile forces on opposite ends of the bell crank to pivot the bell crank in a first direction by force from the first spring and a second direction by force from the second spring;
    the first spring connected to the bell crank at a first attachment point that is at a first of the opposite ends of the bell crank, and the second spring connected to the bell crank at a second attachment point; and
    a motion control rod attached to the bell crank at a motion control rod attachment point of the bell crank and connecting the bell crank to a continuously variable transmission connected by a belt to an engine and causing a traction drive wheel to rotate forwardly if the bell crank pivots in the first direction and rearwardly if the bell crank pivots in the second direction;
    the second attachment point is between the motion control rod attachment point and a pivot axis of the bell crank;
    the pivot axis of the bell crank is perpendicular to a pivot axis of the forward pedal.

* * * * *